(12) United States Patent
Okada et al.

(10) Patent No.: US 9,885,790 B2
(45) Date of Patent: Feb. 6, 2018

(54) RADIATION IMAGING APPARATUS AND CONTROL METHOD THEREOF

(71) Applicant: CANON KABUSHIKI KAISHA, Tokyo (JP)

(72) Inventors: Hideyuki Okada, Honjo (JP); Toshio Kameshima, Kawasaki (JP); Eriko Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 15/186,862

(22) Filed: Jun. 20, 2016

(65) Prior Publication Data
US 2016/0377737 A1    Dec. 29, 2016

(30) Foreign Application Priority Data
Jun. 26, 2015    (JP) ................................. 2015-129199

(51) Int. Cl.
*G01T 1/17*        (2006.01)
*H04N 5/32*        (2006.01)

(52) U.S. Cl.
CPC .................. *G01T 1/17* (2013.01); *H04N 5/32* (2013.01)

(58) Field of Classification Search
None
See application file for complete search history.

(56) References Cited

U.S. PATENT DOCUMENTS

| 7,386,089 B2 | 6/2008 | Endo et al. ....................... 378/5 |
| 7,403,594 B2 | 7/2008 | Endo et al. .................. 378/114 |
| 7,869,568 B2 | 1/2011 | Yokoyama et al. ......... 378/98.8 |
| 7,965,817 B2 | 6/2011 | Kameshima et al. ....... 378/98.8 |
| 9,234,966 B2 | 1/2016 | Sugawara et al. ........ G01T 1/16 |
| 2014/0112448 A1 | 4/2014 | Takenaka et al. ............ 378/114 |
| 2014/0239187 A1 | 8/2014 | Iwashita et al. ............. 250/394 |
| 2015/0279882 A1 | 10/2015 | Yagi et al. ........ H01L 27/14609 |

FOREIGN PATENT DOCUMENTS

| JP | H07-201490  | 8/1995 |
| JP | 2010-075556 | 4/2010 |
| JP | 2014-219248 | 11/2014 |

*Primary Examiner* — Edwin Gunberg
(74) *Attorney, Agent, or Firm* — Fitzpatrick Cella Harper and Scinto

(57) ABSTRACT

A radiation imaging apparatus that includes a plurality of sensors and a control unit, wherein the control unit performs a first control of monitoring, after a radiation irradiation is started, a signal of a first sensor and accumulating the monitored signal of the first sensor, a second control of outputting, in response to a calculated value obtained by the accumulation and reaching a target value, a control signal to end the radiation irradiation, and a third control of reading out, after the radiation irradiation is ended, the signals of the respective plurality of sensors, and the control unit changes a monitoring cycle of the first control based on the target value and an elapsed time since the radiation irradiation has been started.

11 Claims, 9 Drawing Sheets

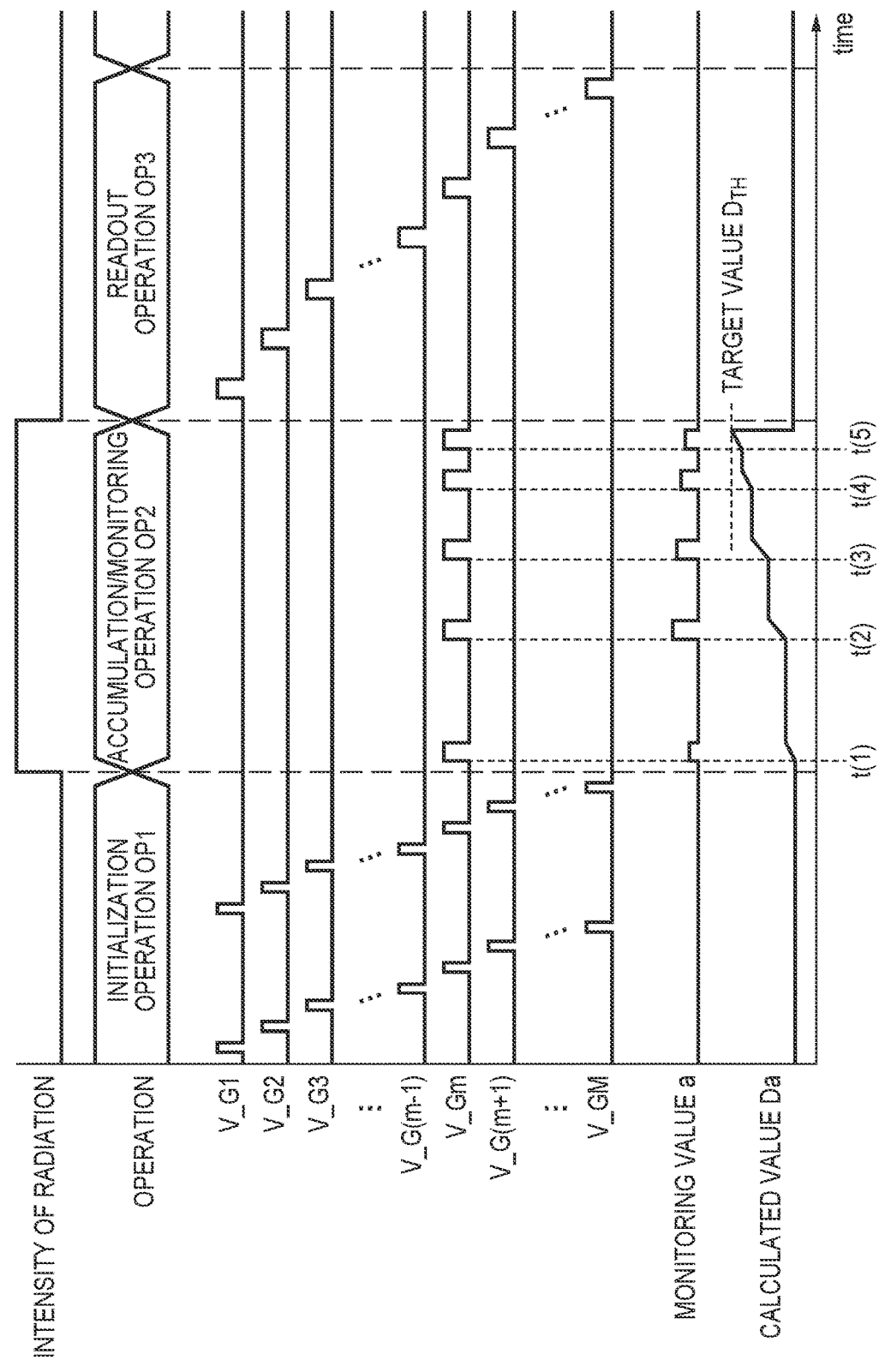

RADIATION IMAGING APPARATUS AND CONTROL METHOD THEREOF

BACKGROUND OF THE INVENTION

Field of the Invention

The present invention relates to a radiation imaging apparatus and a control method thereof.

Description of the Related Art

A radiation imaging apparatus can include, for example, a sensor array in which a plurality of sensors are arrayed and a readout unit which reads out a signal from each sensor. Among radiation imaging apparatuses, there is an apparatus that is configured to perform Automatic Exposure Control (AEC) which ends radiation irradiation when a radiation dose to the sensor array reaches a target value.

In Japanese Patent Laid-Open No. 7-201490, some sensors, out of a plurality of sensors, are used as monitoring sensors to monitor the radiation dose, and signals from the monitoring sensors are sampled by predetermined cycles after radiation irradiation is started. According to Japanese Patent Laid-Open No. 7-201490, the above-described AEC is performed based on the result of the sampling performed at predetermined cycles.

In Japanese Patent Laid-Open No. 2010-75556, some sensors, out of a plurality of sensors, are used as monitoring sensors and signals from the monitoring sensors are sampled at least twice after radiation irradiation is started. According to Japanese Patent Laid-Open No. 2010-75556, the above-described AEC is performed by determining the radiation irradiation end timing based on the sampling timings and the results of these samplings.

Since ringing or dulling of the waveform can occur in the pulse waveform of the radiation, problems such as excessive radiation irradiation, mixing of random noise along with an increase in number of samplings or the like may occur. These problems can reduce the accuracy of AEC.

SUMMARY OF THE INVENTION

The present invention provides a technique advantageous in increasing the accuracy of AEC.

One of the aspects of present invention provides a radiation imaging apparatus that includes a plurality of sensors, a drive unit configured to drive the plurality of sensors, a readout unit configured to read out a signal from each sensor driven by the drive unit, and a control unit, wherein the control unit performs a first control of monitoring, after radiation irradiation to the plurality of sensors has been started, a signal of a first sensor, out of the plurality of sensors, while driving the first sensor by the drive unit to read out the signal of the first sensor by the readout unit, and accumulating the monitored signal of the first sensor, a second control of outputting, in response to a calculated value obtained by the accumulation in the first control and reaching a target value, a control signal to end the radiation irradiation, and a third control of reading out, after the radiation irradiation is ended by the second control, the signals of the respective plurality of sensors by the readout unit while driving the plurality of sensors by the drive unit, and the control unit changes a monitoring cycle of the first control based on the target value and an elapsed time since the radiation irradiation has been started.

Further features of the present invention will become apparent from the following description of exemplary embodiments with reference to the attached drawings.

BRIEF DESCRIPTION OF THE DRAWINGS

FIG. 9 is a timing chart for explaining an example of the AEC operation.

DESCRIPTION OF THE EMBODIMENTS (Configuration Example of Imaging System)

Figure 1:
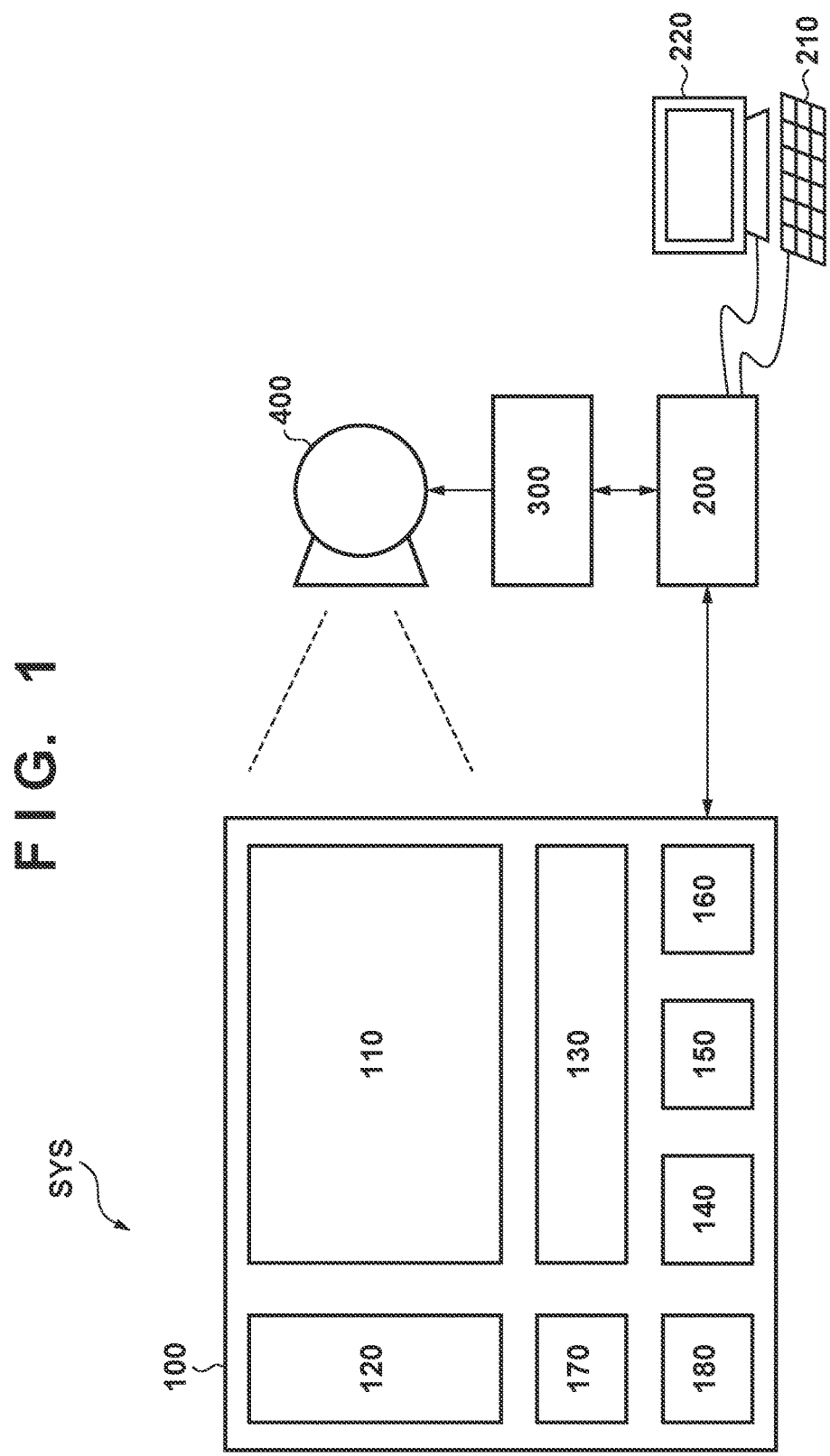
FIG. 1 is a block diagram for explaining an example of the configuration of an imaging system.

FIG. 1 shows a configuration example of an imaging system SYS to perform radiation imaging. The imaging system SYS includes a radiation imaging apparatus 100, a processor 200, a radiation controller 300, and a radiation source 400. The processor 200 controls the radiation imaging apparatus 100 and radiation controller 300 based on, for example, imaging conditions input by the user via a terminal 210. The radiation controller 300 drives the radiation source 400 based on a signal from the processor 200, and the driven radiation source 400 generates radiation (for example, an X-ray, α-ray, or β-ray). The radiation is transmitted through an object to be examined (not shown), and the radiation imaging apparatus 100 detects this radiation containing information of the object to be examined. The radiation imaging apparatus 100 generates image data based on the detected radiation, and outputs the image data to the processor 200. The processor 200 outputs a radiation image based on the image data to a display unit 220 such as a display.

The radiation imaging apparatus 100 includes a sensor array 110, a drive unit 120, a readout unit 130, a processor 140, a hold unit 150, a communication unit 160, a control unit 170, and a power supply unit 180.

The sensor array 110 includes a plurality of sensors so arranged as to form a plurality of rows and a plurality of columns on a substrate. Each sensor includes a detecting element for detecting radiation and can include, for example, a photoelectric conversion element (PIN photodiode, MIS sensor or the like) formed by amorphous silicon on an insulating substrate such as a glass substrate. In this case, a scintillator for converting radiation into light can be arranged on the side of an irradiation surface of the sensor array 110.

The drive unit 120 drives the sensors of the sensor array 110 row by row. The drive unit 120 includes a scanning circuit formed by using, for example, shift registers, and sequentially selectively drives the sensors on each row. The readout unit 130 reads out a signal from each of a plurality of sensors driven by the drive unit 120. The value of this signal corresponds to the radiation dose detected by the corresponding sensor. In this example, the signal value corresponds to the quantity of light having entered the corresponding sensor from the scintillator.

The processor 140 is formed by an integrated circuit such as an ASIC, generates image data based on a signal read out by the readout unit 130, and performs data processing such as a correction process on the image data. The hold unit 150 is a memory for holding image data, and it is possible to use, for example, a volatile memory such as a DRAM, a non-volatile memory such as a flash memory, or another known storage means. The communication unit 160 is an external interface for exchanging signals and data with the processor 200, and it is possible to use a wired communicating means or wireless communicating means. The communication unit 160 may also exchange signals and data with another unit (not shown).

To properly perform radiation imaging, the control unit 170 controls the operations of the above-mentioned units forming the radiation imaging apparatus 100, for example, controls synchronization of these units by using a reference signal such as a clock signal. The power supply unit 180 supplies electrical power to each unit so that the unit properly operates. For example, the power supply unit 180 generates one or more voltages based on external electrical power, and supplies each generated voltage to a corresponding unit.

The radiation imaging apparatus 100 starts radiation imaging upon detecting the start of radiation irradiation. For example, the processor 200 supplies, to the radiation control unit 300, a control signal to drive the radiation source 400 and supplies a signal that indicates the start of radiation irradiation to the radiation imaging apparatus 100. In another example, an exposure switch (not shown) to start radiation irradiation is connected to the radiation control unit 300 and a signal that indicates the start of radiation irradiation can be supplied to the radiation imaging apparatus 100 in accordance with a user pressing the exposure button. Alternatively, a dedicated sensor for detecting the start of radiation irradiation can be provided in the radiation imaging apparatus 100 or the radiation imaging apparatus 100 can have another known configuration for detecting the start of radiation irradiation by itself.

The configurations of the imaging system SYS and radiation imaging apparatus 100 are not limited to the above-described examples, and the arrangements of the aforementioned units can appropriately be changed. For example, a part of the function of a given unit may also be achieved by another unit, and the functions of two more units may also be achieved by one unit. For example, a part of the function of the processor 140 may also be implemented by the processor 200, and the processor 140 and processor 200 may also be formed by a single unit.

(Configuration Example of Sensor Array and Readout Unit)

Figure 2:
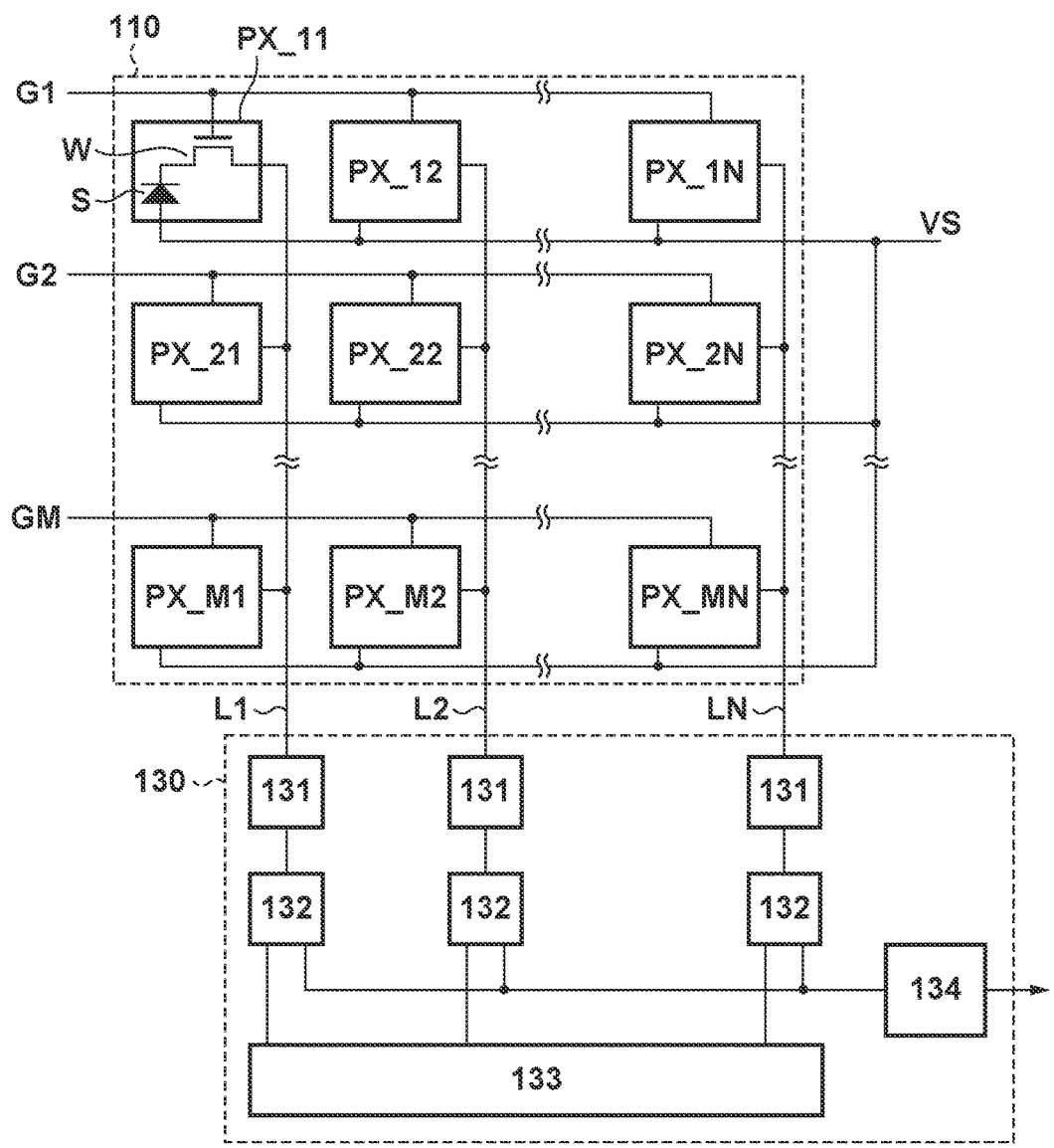
FIG. 2 is a block diagram for explaining an example of the configuration of a radiation imaging apparatus.

FIG. 2 shows a configuration example of the sensor array 110 and readout unit 130. In this example, the sensor array 110 includes a plurality of sensors PX (PX_11, PX_12, ..., PX_MN) so arranged as to form M rows and N columns. The sensor PX may also be referred to as a "pixel".

For example, the sensor PX_11 positioned in the first row and first column includes a photoelectric conversion element S and thin-film transistor W. For example, one terminal of the photoelectric conversion element S is connected to the thin-film transistor W, and the other terminal thereof is connected to a power line for propagating a reference voltage VS received from the power supply unit 180. The thin-film transistor W is turned on or off in response to a signal received from the drive unit 120 via a signal line G1. While the thin-film transistor W is kept off, electric charge is stored in the photoelectric conversion element S. When the thin-film transistor W is turned on, a signal corresponding to the amount of accumulated charge is transferred to the readout unit 130 via a corresponding column signal line L1. This applies to other sensors PX_12, ..., PX_MN.

The readout unit 130 includes signal amplifying units 131, sampling units 132, a scanning circuit 133, and an output unit 134. The signal amplifying units 131 are arranged in one-to-one correspondence with the columns, and each amplify signals from corresponding sensors PX. For example, the signal amplifying unit 131 can include an integral amplifier, a variable amplifier, or another known signal amplifying circuit. The sampling units 132 are arranged in one-to-one correspondence with the columns, and each sample a signal from a corresponding signal amplifying unit 131. The sampling unit 132 can include a switching element and capacitor, and can further include a buffer amplifier for amplifying the sampled signal. The scanning circuit 133 is formed by using shift registers or the like, and supplies a control signal to the sampling unit 132 corresponding to each column. In response to this control signal from the scanning circuit 133, the sampling unit 132 transfers the sampled signal to the output unit 134. The output unit 134 includes an output circuit for outputting the sampled signal to an external unit (for example, the processor 140). For example, the output unit 134 can include a buffer amplifier and A/D converter.

The processor 140 processes the signals from the plurality of sensors PX read out by the readout unit 130, as image data of one frame. That is, image data of one frame is obtained by reading out signals from the plurality of sensors PX once.

(Reference Example of Automatic Exposure Control)

Figure 3:
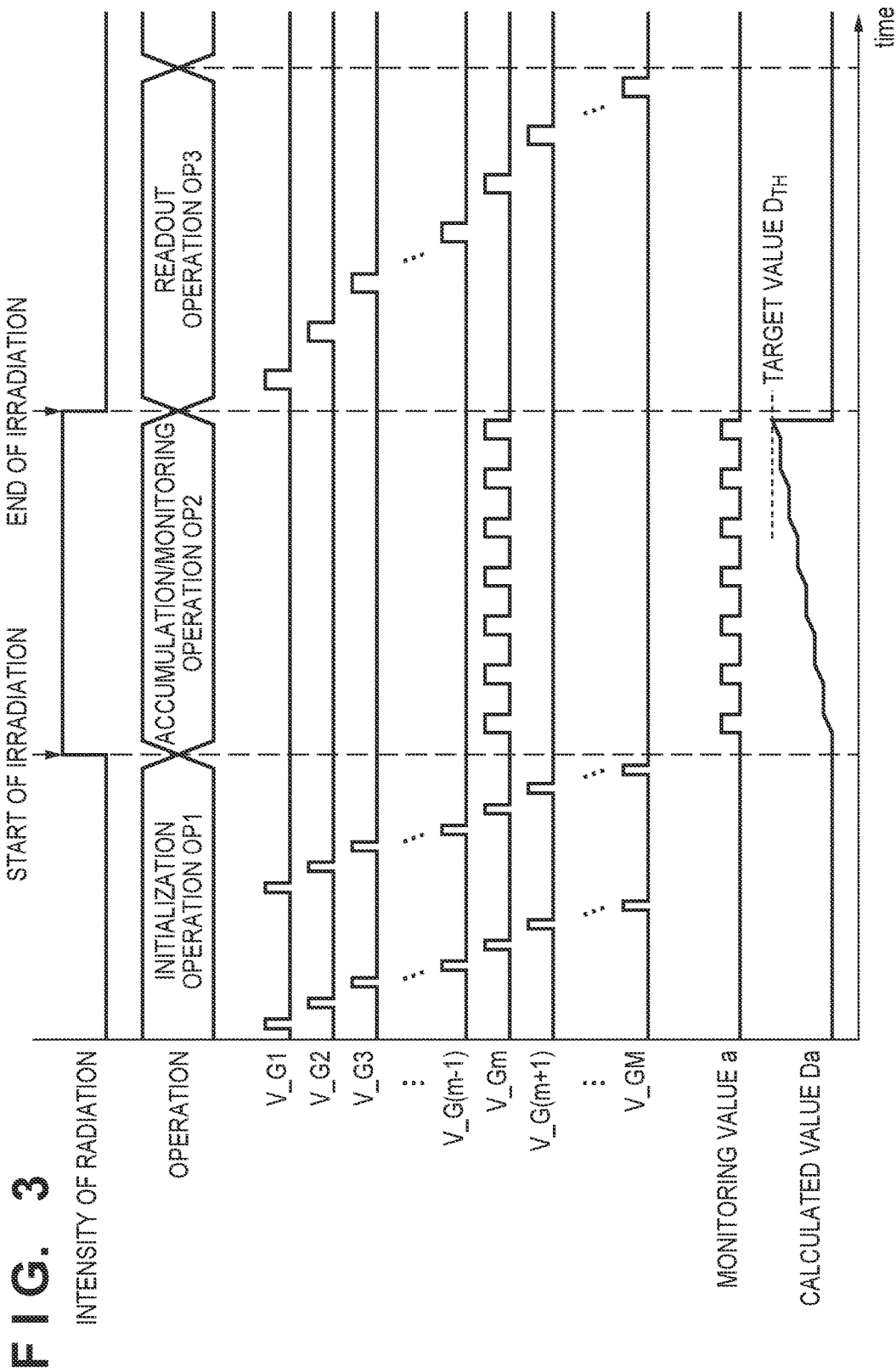
FIG. 3 is a timing chart for explaining a reference example of an AEC operation.

A reference example of AEC (Automatic Exposure Control) in the radiation imaging apparatus 100 will be described with reference to FIG. 3. FIG. 3 shows a timing chart of AEC. In FIG. 3, the abscissa indicates the time. In FIG. 3, the ordinate indicates the intensity of radiation, operation, signals such as V_G1, etc. (V_G1, V_G2, ..., V_GM), a monitoring value a, and a calculated value Da.

"Intensity of radiation" in FIG. 3 indicates the intensity of radiation irradiation or the irradiation rate. That is, the intensity of radiation indicates the radiation dose per each unit time, and a result obtained from time-integrating the intensity of radiation becomes the radiation dose. Here, for the sake of descriptive convenience, assume a case in which an ideal rectangular radiation pulse is supplied, and that L-level indicates a state in which no radiation irradiation is being performed and H-level indicates a state in which radiation irradiation is being performed in FIG. 3.

"Operation" in FIG. 3 indicates each operation which is to be performed in the radiation imaging apparatus 100 at the time of radiation imaging and corresponds to an operation mode or state of the radiation imaging apparatus 100. Although details will be given later, an initialization operation OP1 is performed before the start of radiation irradiation. Then, in response to the start of radiation irradiation, the initialization operation OP1 is canceled and an accumulation/monitoring operation OP2 is started. Finally, triggered by the end of radiation irradiation, the accumulation/monitoring operation OP2 is canceled and a readout operation OP3 is started.

"V_G1" in FIG. 3 is a control signal propagating in the signal line G1 (Refer to FIG. 2). If the signal V_G1 is activated, the first row sensors PX_11 to PX_1N are driven. That is, when the signal V_G1 shifts to H-level, the transistors W of the respective first row sensors PX_11 to PX_1N become electrically conductive, and the signals of the respective photoelectric conversion elements S are transferred via the corresponding column signal lines such as L1 and the like to the readout unit 130. The same operation is performed for other signals V_G2 to V_GM.

"Monitoring value a" in FIG. 3 indicates the output from the readout unit 130 during the accumulation/monitoring operation OP2 (outputs from the initialization operation OP1 and readout operation OP3 are not included). In addition, "calculated value Da" in FIG. 3 is a value obtained by accumulating the monitoring values and may be called an "integrated value".

First, the initialization operation OP1 is performed before the start of radiation irradiation. The initialization operation OP1 can be performed by repeatedly performing activation by activating the signals V_G1, V_G2, . . . , V_GM in this order (setting the thin film transistors W in an electrically conductive state) in a state in which the column signal lines L1 to LN are fixed to a constant potential. Accordingly, charges due to a dark current of the substrate are removed from each photoelectric conversion element S and the potential of each photoelectric conversion element S is initialized. Note that the initialization method and the configuration for initialization are not limited to the above-described example, and a reset transistor may be provided for each sensor PX or another known initialization means can be used.

Next, in response to the start of radiation irradiation, the initialization operation OP1 is ended and the accumulation/monitoring operation OP2 is started. The start of radiation irradiation can be, as described above, detected when the radiation imaging apparatus 100 receives a signal indicating the start of radiation irradiation. In the accumulation/monitoring operation OP2, charges are accumulated in the plurality of sensors PX and the accumulated charge amount of some of the plurality of sensors PX is monitored by reading out signals in a predetermined cycle from some of the plurality of sensors PX. More specifically, for example, letting M be a given integer from 1 to m, a signal V_GM is activated at a predetermined cycle to drive the mth row sensors PX_m1 to PX_mN. The signals from the respective mth row sensors PX_m1 to PX_mN that have been driven are read out by the readout unit 130 as the above-described monitoring values a.

That is, during the accumulation/monitoring operation OP2, each of the mth row sensors PX_m1 to PX_mN can be represented as a sensor which functions as a monitoring sensor (first sensor) to monitor the radiation dose or the longitudinal changes of the radiation dose. Note that although, in this configuration example, the above-described monitoring value a is a value obtained by amplifying a monitoring sensor signal by the corresponding signal amplification unit 131, sampling the amplified signal by the corresponding sampling unit 132, and outputting the sampled signal to the output unit 134, it need only be a value corresponding to the value of the monitoring sensor signal.

When the calculated value Da which is the accumulated value of the monitoring value a reaches a target value $D_{TH}$ (target value $D_{TH}$ is value corresponding to a target value, an allowable value, and an upper limit value or the like of the radiation dose and can be, for example, preset by the user), a control signal to end radiation irradiation is accordingly output to the radiation control unit 300 via the processor 200. In this manner, AEC is performed and radiation irradiation is stopped.

Triggered by the end of radiation irradiation, the accumulation/monitoring operation OP2 is ended and the readout operation OP3 is started. In the readout operation OP3, the signals V_G1, VG_2, . . . , VGM are activated in this order (setting the respective thin film transistors W to an electrically conductive state), and signals are read out from the plurality of sensors PX by the readout unit 130. The processor 140 generates image data based on the readout signals.

Note that for each of the signals V_G1 and the like, the pulse width in the initialization operation OP1, the pulse width in the accumulation/monitoring operation OP2, and the pulse width in the readout operation OP3 can be different from each other, but may be equal to each other or some may be equal to each other.

The signal read out from each of the mth row sensors PX_m1 to PX_mN in the readout operation OP3 has lost a part of its signal component due to the signal being read out as the monitoring value a during the accumulation/monitoring operation OP2. Therefore, it is preferable to add the calculated value Da which is the accumulated value of the monitoring value a to each signal read out from each of the mth row sensors PX_m1 to PX_mN during the readout operation OP3. In another example, each signal read out from each of the mth row sensors PX_m1 to PX_mN can be corrected based on signals read out from the sensor PXs of an adjacent row ((m−1)th row and or (m+1)th row). In yet another example, each signal read out from each of the mth row sensors PX_m1 to PX_mN can be complemented by signals read out from the adjacent row sensor PX.

According to this reference example, during the accumulation/monitoring operation OP2, a signal is read out, in predetermined cycles, from each of the mth row sensors PX_m1 to PX_mN as the monitoring value a. Note that this readout cycle can be referred to as a "monitoring cycle". If the intensity of radiation is comparatively high and the monitoring cycle is not sufficiently long, the calculated value Da may largely exceed the target value $D_{TH}$. On the other hand, if the monitoring cycle is set comparatively long and the intensity of radiation is comparatively low, signal readout will be performed an excessive number of times and as a result, an equivalent amount of noise components (random noise accompanying signal readout) will be superimposed on the monitoring value a and the calculated value DA obtained based on the monitoring values a.

Therefore, in the example of the AEC operation according to the present invention, the monitoring cycle is changed based on predetermined conditions. Several embodiments will be explained with reference to FIGS. 4 to 9.

(First Embodiment of Automatic Exposure Control)

Figure 4:
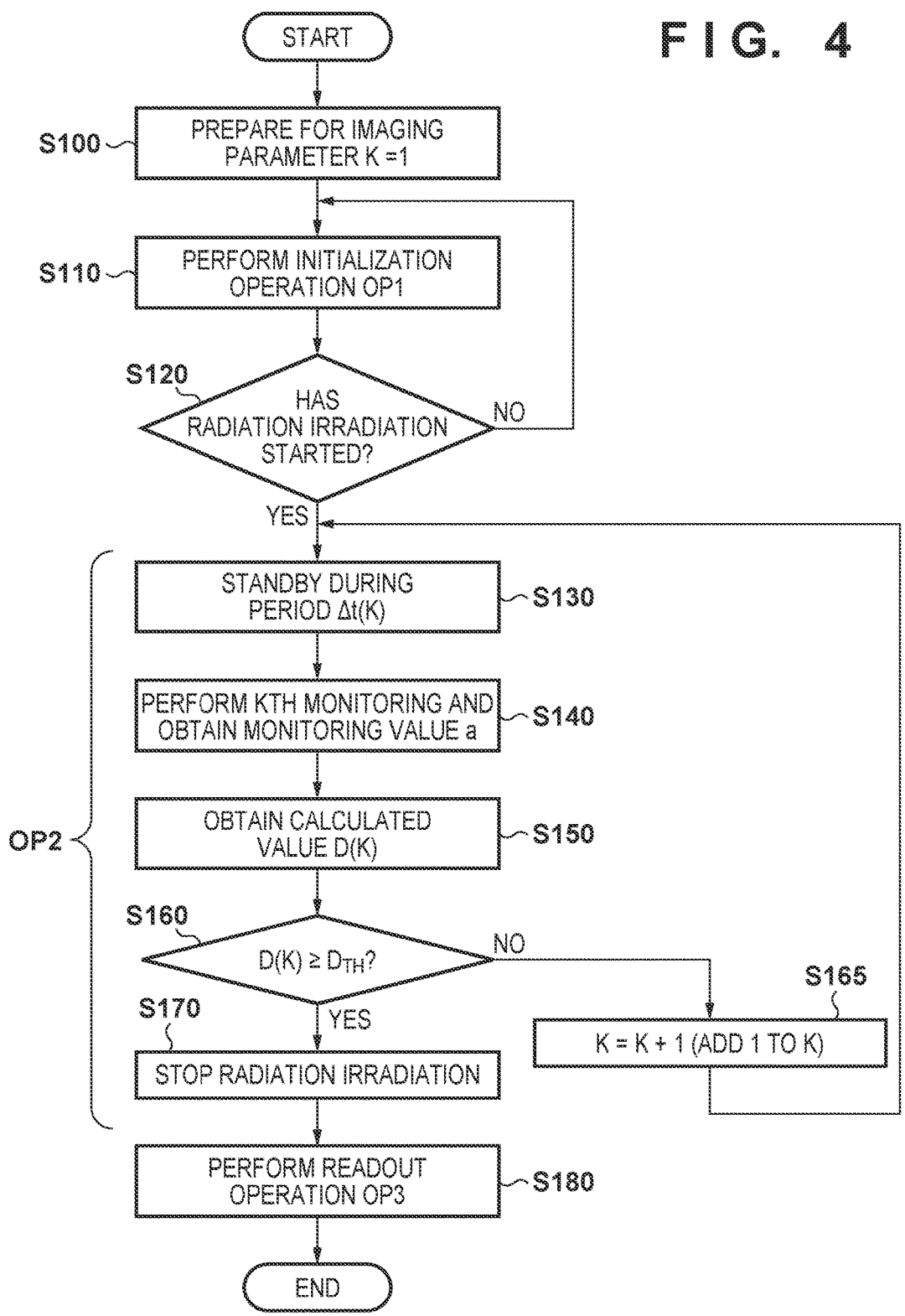
FIG. 4 is a flowchart for explaining an example of an AEC operation.

FIG. 4 is a flowchart showing an AEC operation according to the first embodiment. First, in step S100 (to be simply referred to as "S100" hereinafter; this applies to other steps), preparation for imaging is made to start radiation imaging. In the preparation for imaging, for example, after a radiation imaging apparatus 100 is activated, standby driving for activating each unit of the radiation imaging apparatus 100 is performed. For example, based on a control signal from a control unit 170, a power supply unit 180 applies a voltage generated based on external electrical power to a corresponding unit. In addition, in S100, "1" is set as a parameter K. The parameter K is an integer of 1 or more and is information that indicates the ordinal number of the monitoring operation.

In S110, an initialization operation OP1 is performed. Since the initialization operation OP1 will be performed in the same manner as the contents described with reference to FIG. 3 (reference example) and a description thereof will be omitted.

In S120, whether radiation irradiation has started is determined. If radiation irradiation has been started, the process advances to S130. Otherwise, the process returns to S110.

That is, initialization of each sensor PX is repeated by the initialization operation OP1 until radiation irradiation is started.

S130 to S170 correspond to an accumulation/monitoring operation OP2.

In S130, standby is performed for a period Δt(K) and the process subsequently advances to S140. A period Δt(K) indicates the period between time t(K) which is the Kth monitoring timing and time t(K−1) which is the (K−1)th monitoring timing. That is, time t(K) is given by t(K)=t(K−1)+Δt(K).

Note that time t(0) is the time at which radiation irradiation is started. The first monitoring operation can be performed at a sufficiently early timing so that a calculated value Da obtained by the monitoring operation will be sufficiently smaller than a target value $D_{TH}$. That is, an appropriate value which can sufficiently make the calculated value Da smaller than the target value $D_{TH}$ can be provided at the period Δt(1) and time t(t) (=t(0)+Δt(1)).

In the first embodiment, the period Δt(K) is set long in proportion to the elapsed time since the start of radiation irradiation. This allows the aforementioned monitoring cycle to become longer along with the lapse of time after the start of accumulation/monitoring operation OP2. Hence, this can prevent, in a case where comparatively high intensity radiation irradiation is performed, a state in which the calculated value Da largely exceeds the target value $D_{TH}$, thereby preventing excessive radiation irradiation. In addition, this can prevent, in a case where comparatively low intensity radiation irradiation is performed, an excessive number of signal readouts and can reduce the noise component which may be superimposed on a monitoring value a and the calculated value Da.

For example, assume that the elapsed time since the start of radiation irradiation at the time of the Kth monitoring operation is given by T(K) (that is, T(K)=t(K)−t(0)). The (K+1)th monitoring time t (K+1) is given by t(K+1)=t(k)+Δt(K+1) and Δt(K+1) is determined at this time so that following relation holds:

$$\Delta t(K+1) \propto T(K)$$

That is, if the calculated value obtained from the first to the Kth monitoring operations does not reach the target value $D_{TH}$ as a result of the Kth monitoring operation, time t(K+1) to perform the (K+1)th monitoring operation can be determined so that the following relation holds:

$$\{t(K+1)-t(K)\} \propto T(K)$$

Next, in S140, the Kth monitoring operation is performed, and the monitoring value a is obtained. As described above, since K=1 has been set in S100, after only standing by for the period Δt(1) S130, the first monitoring operation is performed in S140 and the monitoring value a is obtained.

In S150, the calculated value (to be "calculated value D(K)" in order to be distinguished from the calculated value Da at another timing) which is the accumulated value of the monitoring values a at that point of time is calculated.

In S160, it is determined whether the calculated value D(K), obtained in S150, has reached the target value $D_{TH}$. If D(K)<$D_{TH}$, the process advances to S165. If D(K)≥$D_{TH}$, the process advances to S170. In step S165, 1 is added to the parameter K (setting K=2), and the process returns to S130. Subsequently, the same processes from S130 to S160 are performed for the case of K≥2.

In S170, radiation irradiation is stopped. As described above, this can be performed by, for example, outputting a control signal to stop radiation irradiation to the radiation control unit 300.

In S180, the readout operation OP3 is performed. The readout operation OP3 is the same as that described with reference to FIG. 3 and a description thereof will be omitted.

Figure 5:
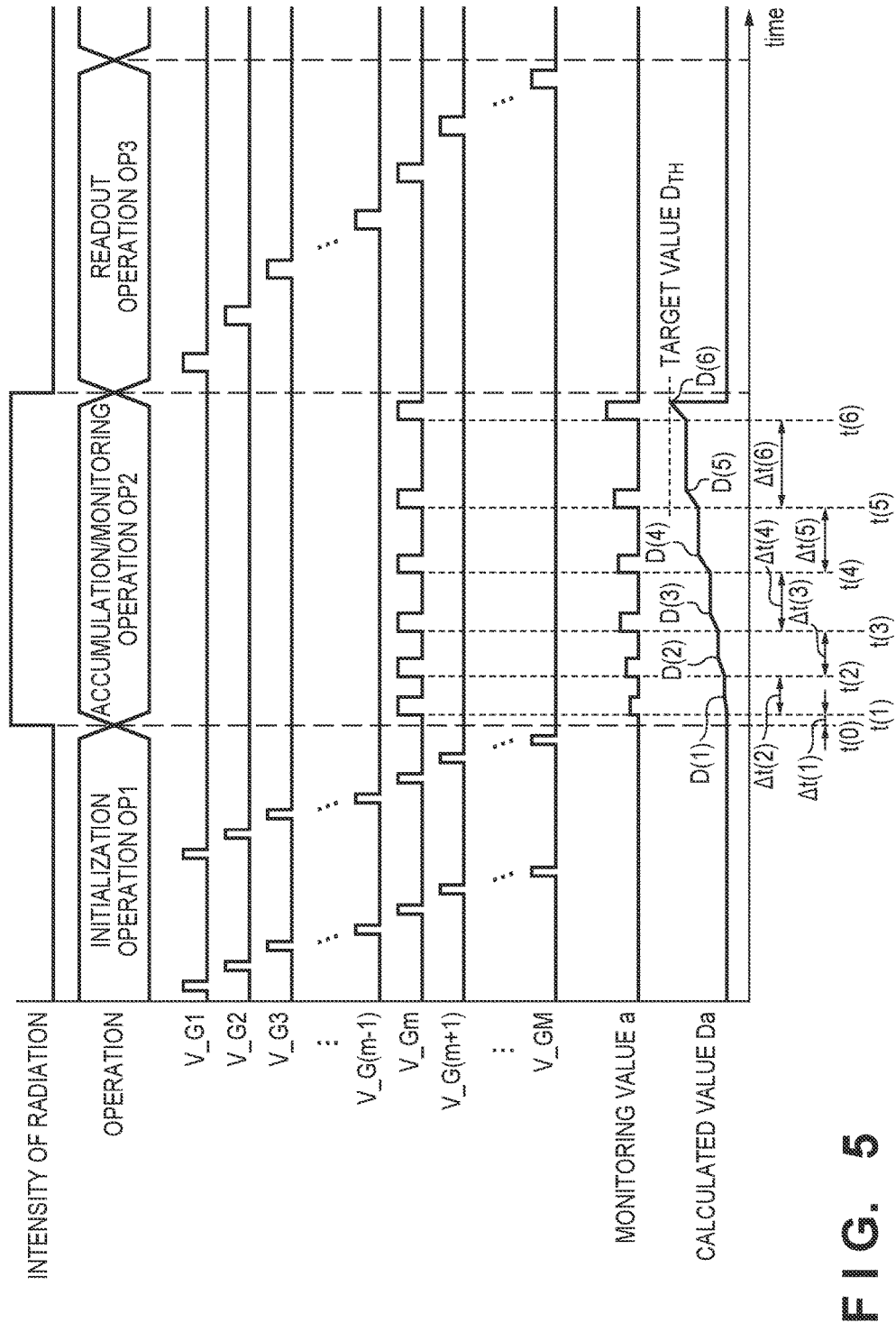
FIG. 5 is a timing chart for explaining an example of the AEC operation sequence.

FIG. 5 shows, in the same manner as in FIG. 3, a timing chart of an AEC operation according to the first embodiment. Compared to the timing chart of the reference example in FIG. 3, this timing chart mainly differs in the timings of the monitoring operation (that is, the activation timing of signal V_Gm, the monitoring value a and the calculated value DA thereof) during the accumulation/monitoring operation OP2.

After the start of radiation irradiation at time t(0), the initialization operation OP1 is ended and the accumulation/monitoring operation OP2 is started, and the first monitoring operation is performed at time t(1) after the period Δt(1) has elapsed. That is, at time t(1), the signal V_Gm is activated and signals read out from the respective mth row sensors PX_m1 to PX_mN are obtained as the monitoring values a to determine whether the calculated value Da (=D(1)), at this time, has reached the target value $D_{TH}$.

Since the calculated value Da (=D(1)) has not reached the target value $D_{TH}$, a second monitoring operation is performed at time t(2) after the period Δt(2) has elapsed, and it is determined whether the calculated value Da (=D(2)) at that time has reached the target value $D_{TH}$.

In this manner, a sequence of operations including the monitoring operation and a comparison operation of the calculated value Da and the target value $D_{TH}$ is performed until the calculated value DA reaches the target value $D_{TH}$. In the first embodiment, the calculated value Da (=D(6)) reaches the target value $D_{TH}$ in the sixth monitoring operation, that is, the accumulation/monitoring operation OP2 is ended at K=6.

According to the above-described first embodiment, the monitoring cycle of the accumulation/monitoring operation OP2 is made long along with the elapsed time. Hence, this can prevent, in the case where comparatively high intensity radiation irradiation is performed, a state in which the calculated value Da will largely exceed the target value $D_{TH}$, thereby preventing excessive radiation irradiation. In addition, this can prevent, in the case where comparatively low intensity radiation irradiation is performed, an excessive number of signal readouts and can reduce the noise component which could be superimposed on the monitoring value a and the calculated value Da. Therefore, according to the first embodiment, it can advantageously increase the accuracy of AEC.

Note that, the first embodiment described a case that focused on the monitoring cycle (or the monitoring interval) and increased the monitoring cycle along with the lapse of time. However, the monitoring cycle is determined by each operation of the drive unit 120, the readout unit 130, and the components that form these units and can be expressed from another point of view. For example, the monitoring cycle can be expressed by increasing the drive cycle (or the drive interval) of the drive unit 120 and the readout cycle (or the readout interval) by the readout unit 130 along with the lapse of time or may also be expressed by using another component.

Modification of the First Embodiment

In the aforementioned first embodiment, the period Δt(K) is set long in proportion to the elapsed time since the start of radiation irradiation, that is, it showed an example in which time t(K+1) to perform the (K+1)th monitoring operation was determined so as to hold the relation $\{t(K+1)-t(K)\} \propto T(K)$. The proportionality coefficient can be, for example, determined based on the various conditions of radiation imaging. For example, time t(K+1) can be determined so as to hold the following relation:

$$\{t(K+1)-t(K)\}=\alpha \times (\Delta D_{TH}/D_{TH}) \times T(K)$$

(where $\Delta D_{TH}$ represents an error tolerance range from the target value $D_{TH}$ and $\alpha$ represents a coefficient set in accordance with the imaging condition, the operation mode, the circuit arrangement, or the like.)

The modification of the first embodiment will be described below by using specific numerical values in comparison with the aforementioned reference example.

First, a case where the intensity of radiation is comparatively high will be considered. Assume that the intensity of radiation is 1,000 [LSB/msec] and the target dose is 2,000 [LSB].

In the aforementioned reference example, assume that the monitoring interval, which is the reciprocal of the monitoring cycle, is set at 0.3 [msec]. In this case, the radiation dose during one monitoring operation is 300 [LSB] and the monitoring value a to be read out will be a value equivalent to 300 [LSB]. Here, if radiation irradiation is to be stopped in accordance with whether the radiation dose has reached a target dose (that is, whether the calculated value Da has reached the target value $D_{TH}$), the timing may shift, and a shift of one monitoring cycle at maximum may occur. Hence, the maximum shift amount, due to this, of the actual radiation dose from the target dose can be considered to be 300 [LSB]. In the reference example, the radiation irradiation time is about 2 [msec] and the number of monitoring operations is 7. Here, if the random noise to be superimposed in one monitoring operation is ±5 [LSB], the random noise to be superimposed by the 7 monitoring operations is ±13 [LSB] (=(±5 [LSB]×sqrt(7)). Hence, in consideration, the maximum shift amount of the actual radiation dose from the target dose (2,000 [LSB]) becomes a total of 313 [LSB], that is, an error of 15.7% can occur.

In contrast, in the first embodiment, letting $\Delta D_{TH}$=50 [LSB] and $\alpha$=1, the monitoring interval is about 0.15 [msec] immediately before (immediately before the calculated value Da reaches the target value $D_{TH}$) the radiation dose reaches the target dose. In this case, the maximum shift amount of the actual radiation dose from the target dose is considered to be 150 [LSB]. In addition, in the first embodiment, the number of monitoring operations is 17 and the random noise to be superimposed by the 17 monitoring operations becomes ±21 [LSB] (=(±5 [LSB]×sqrt(17)). Hence, in consideration, the maximum shift amount of the actual radiation dose from the target dose (2,000 [LSB]) becomes a total of 171 [LSB], that is, the error can be suppressed to 8.5%.

Next, a case where the intensity of radiation is comparatively low will be considered. Assume that the intensity of radiation is 2 [LSB/msec] and the target dose is 2,000 [LSB].

In the reference example, in the same manner as described above, if the monitoring interval is 0.3 [msec], the maximum shift amount of the actual radiation dose from the target dose can be considered to be 0.6 [LSB]. In addition, in the reference example, the radiation irradiation time is about 1,000 [msec], the number of monitoring operations is 3,333, and the random noise to be superimposed by the 3,333 monitoring operations becomes ±289 [LSB] (=(±5 [LSB])× sqrt(3333)). Hence, in consideration, the maximum shift amount of the actual radiation dose from the target dose (2,000 [LSB]) becomes about a total of 290 [LSB], that is, an error of about 14.5% can occur.

In contrast, in the first embodiment, in the same manner as described above, letting $\Delta D_{TH}$=50 [LSB] and $\alpha$=1, the monitoring interval is about 25 [msec] immediately before the radiation dose reaches the target dose. In this case, the monitoring value a read out by the monitor becomes a value equivalent to 50 [LSB] and the maximum shift amount of the actual irradiation amount from the target dose can be considered to become 50 [LSB]. Also, in the first embodiment, the number of monitoring operations becomes 224, and the random noise to be superimposed by the 224 monitoring operations becomes ±75 [LSB] (=(±5 [LSB])×sqrt(224)). Hence, in consideration, the maximum shift amount of the actual radiation dose from the target dose (2,000 [LSB]) becomes a total of 125 [LSB], that is, the error can be suppressed to 6.3%.

According to the above-described first embodiment, in both a case where the intensity of the radiation is comparatively high and a case where the intensity is comparatively low, an error from the target dose of the radiation dose can be reduced, and the accuracy of AEC of can be advantageously increased.

(Second Embodiment of Automatic Exposure Control)

In the aforementioned first embodiment, during the accumulation/monitoring operation OP2, each of the mth row sensors PX_m1 to PX_mN was made to function as a monitoring sensor, but the sensor PX to serve as a monitoring sensor target can be changed. For example, a sensor PX corresponding to a portion, out of a region on a sensor array 110, where the radiation does not pass through an object to be examined (or a portion having a high likelihood that the radiation will not pass) or another portion of interest to a user may be made to function as the monitoring sensor.

Figure 6:
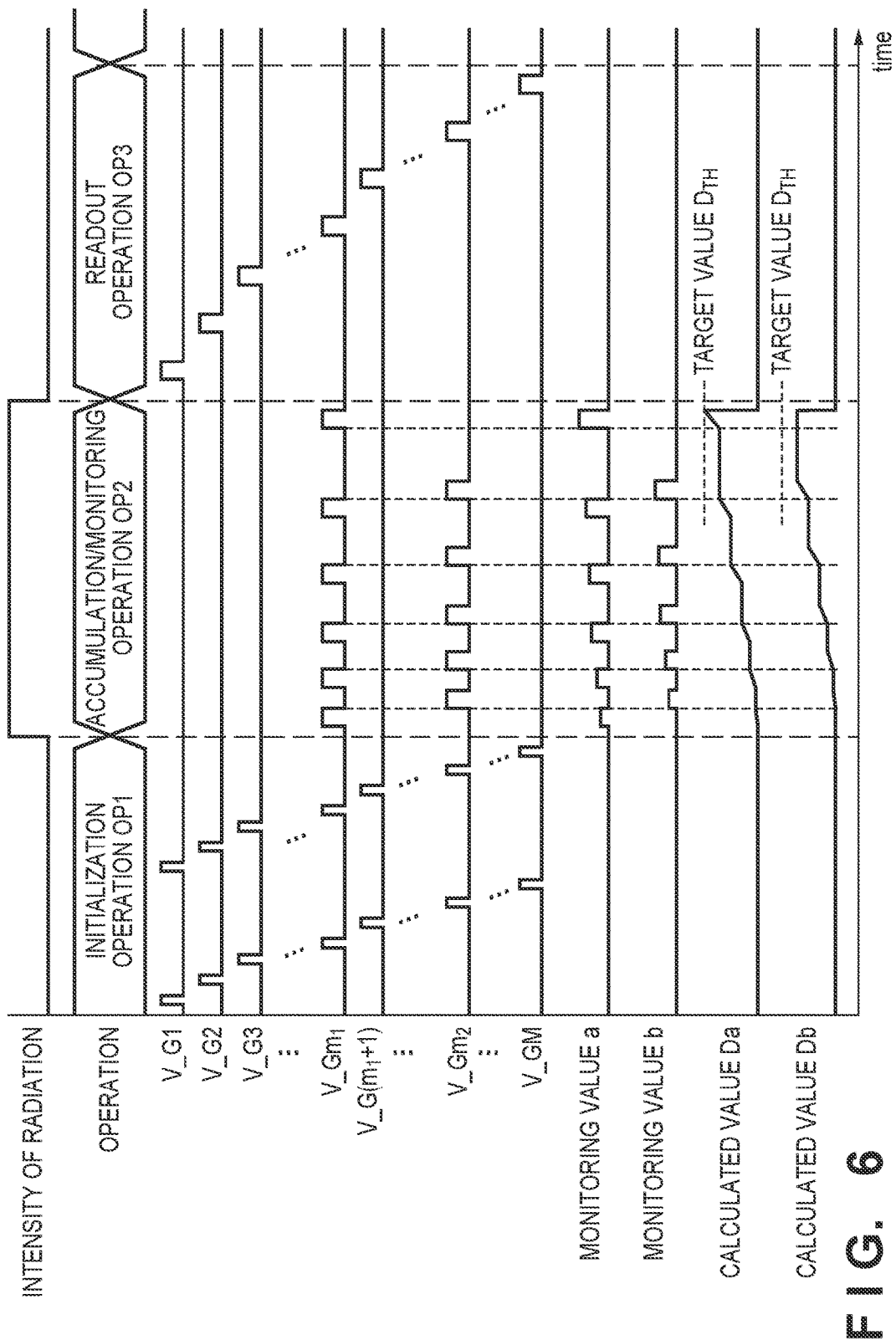
FIG. 6 is a timing chart for explaining an example of an AEC operation.

FIG. 6 shows, in the same manner as FIG. 5 (first embodiment), a timing chart of an AEC operation according to the second embodiment. In the second embodiment, letting $m_1$ and $m_2$ each be an integer of 1 to M and integers different from each other, the $m_1$th row sensors PX (that is, sensors PX_$m_1$1 to PX_$m_1$N) and the $m_2$th row sensors PX (that is, sensors PX_$m_2$1 to PX_$m_2$N) are made to function as monitoring sensors. In FIG. 6, the monitoring value of each $m_1$th row sensor PX is indicated as a monitoring value a and its corresponding calculated value will be indicated as a calculated value Da. In addition, the monitoring value of each $m_2$th row sensor PX is indicated as a monitoring value b and its corresponding calculated value will be indicated as a calculated value Db.

In the second embodiment, the $m_1$th row sensors PX and the $m_2$th row sensors PX can be alternately driven. In the second embodiment, the calculated value Da (=D(6)) reaches a target value $D_{TH}$ during the 6th monitoring operation of the $m_1$th row sensors PX and ends an accumulation/monitoring operation OP2. The same effect as in the aforementioned first embodiment can be obtained by the second embodiment.

Although the $m_1$th and the $m_2$th rows of, that is, two rows of sensors PX were made to function as the monitoring sensors during the accumulation monitoring operation OP2, three or more rows of sensors PX can be made to function as the monitoring sensors. In addition, only some out of the sensors PX of a given row can be made to function as the monitoring sensors, that is, only some of the signals from a given row of sensors PX may be adopted as the monitoring value a.

(Third Embodiment of Automatic Exposure Control)

Although, in the aforementioned first embodiment, the monitoring cycle was set longer along with the lapse of time, the monitoring cycle can be changed based on another reference. In the third embodiment, the next monitoring timing is determined based on past monitoring timings (times) and their monitoring results.

Figure 7:
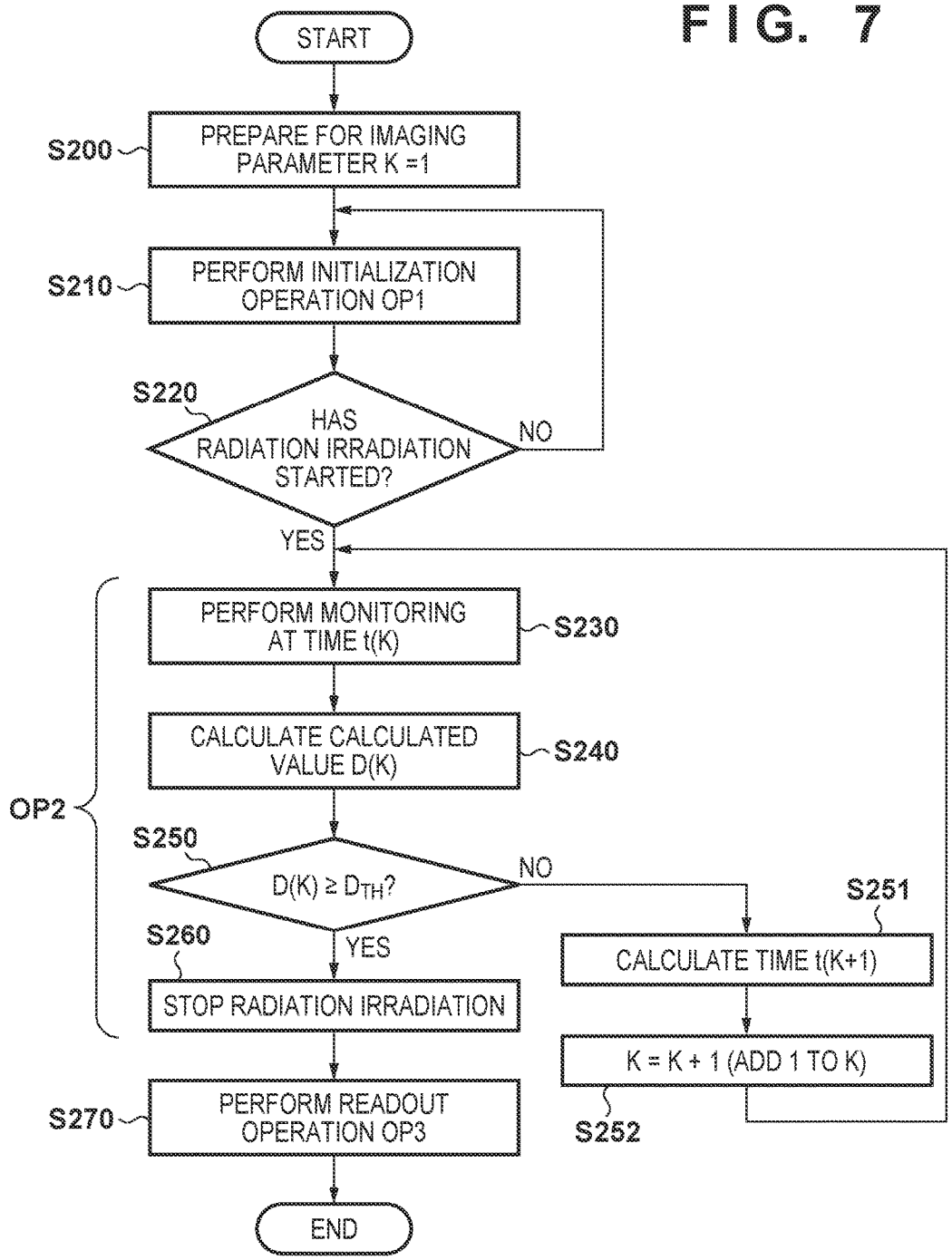
FIG. 7 is a flowchart for explaining an example of an AEC operation.

FIG. 7 shows, in the same manner as in FIG. 4 (first embodiment), a flowchart of an AEC operation according to the third embodiment. S200 to S220 are the same as the contents of S100 to S120 of FIG. 4, and a description thereof will be omitted. S230 to S260 correspond to an accumulation/monitoring operation OP2.

In S230, the Kth monitoring operation is performed at time t(K) and monitoring values a are obtained. Although details will be described later, time t(K) is determined based on past (preceding) monitoring timings (times) and their monitoring results. Here, since K=1 (that is, it is the first monitoring operation and no monitoring operation has been performed previously), the first monitoring operation can be performed at a preset time (time t(1)).

S240, S250, S260, and S270 are the same as the contents of S150, S160, S170, and S180 in FIG. 4, respectively, and a description thereof will be omitted.

In S251, time t(K+1) to perform the (K+1)th monitoring operation, that is, the timing to perform the next monitoring operation is calculated and determined. This process will be described with reference to FIG. 8.

Figure 8:
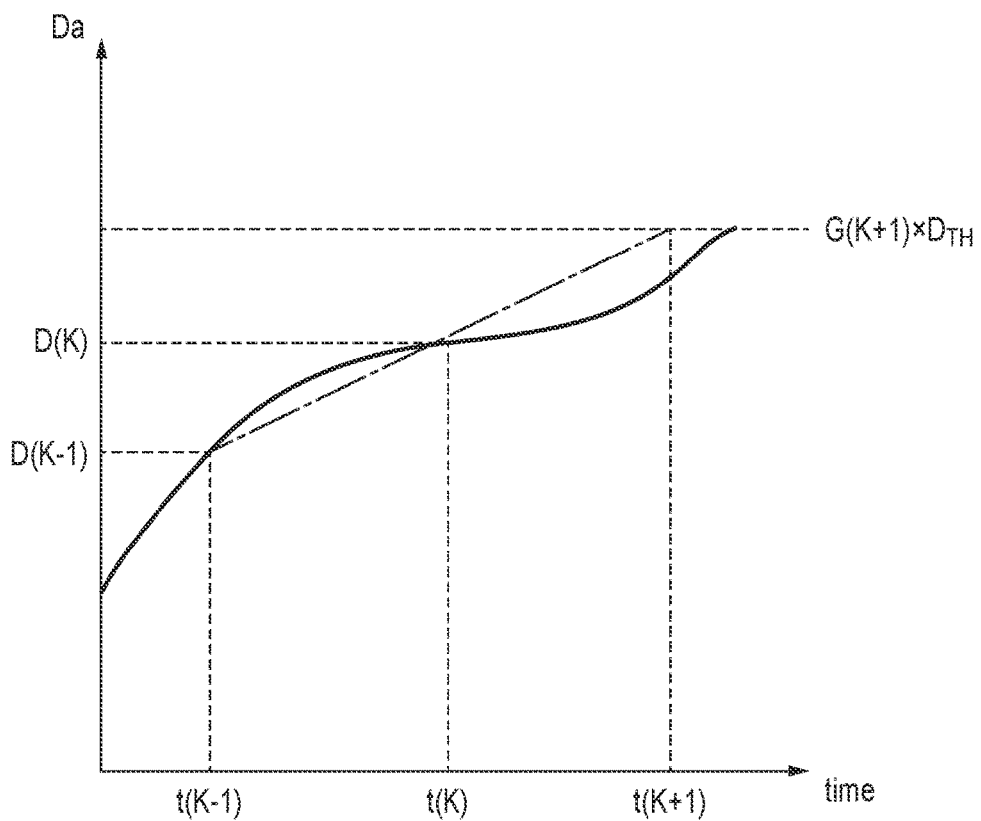
FIG. 8 is a graph for explaining an example of a next sampling time calculation method.

FIG. 8 is a graph for explaining the calculation method of time t(K+1). The abscissa indicates the time and the ordinate indicates the calculated value Da. For example, time t(K−1) is the time when the (K−1)th monitoring operation was performed. A calculated value D(K−1) indicates the calculated value Da obtained from the first to the (K−1) the monitoring operations. Time t(K) is the time at which the Kth monitoring operations was performed. A calculated value D(K) indicates the calculated value Da obtained from the first to the Kth monitoring operations.

In the third embodiment, a coefficient G(K) (that is, G(K) satisfies 0<G(K)≤1 and G(K−1)<G(K)<G(K+1)) will be used to describe an example of a calculation method of time t(K+1). In FIG. 8, G(K+1) indicates a target coefficient to the calculated value Da when the (K+1)th monitoring operation has been performed. That is, $\{G(K+1) \times D_{TH}\}$ indicates the target value of the calculated value Da obtained from the first to the (K+1)th monitoring operations.

At this time, time t (K+1) can, for example, be determined so as to hold the following relation:

$$t(K+1)-t(K)=\{(t(K)-t(K-1)/(D(K)-D(K-1))\} \times \{G(K+1) \times D_{TH}-D(K)\}$$

The target coefficient G(K) can be preset and set so that the calculated value Da gradually becomes closer to a target value $D_{TH}$ in each monitoring operation. For example, G(2) can be 0.5 (50%), G(3) can be 0.75 (75%), G(4) can be 0.88 (88%), G(5) can be 0.94 (94%), and G(6) and subsequent coefficients can be 1 (100%). According to the third embodiment, the calculated value Da can be expected to become closer to the target value $D_{TH}$, thereby preventing a state where the calculated value Da will excessively exceed the target value $D_{TH}$.

Note that the first monitoring operation need only be performed at a sufficiently early timing, particularly, at the timing at which the calculated value Da becomes a value smaller than half the value of the target value $D_{TH}$, so that the calculated value Da obtained by the monitoring operation does not exceed the target value $D_{TH}$.

Returning to FIG. 7, in S252, 1 is added to the parameter K (to set K=2) and the process returns to S230. Subsequently, the same processes of S230 to S250 are performed for the case of K≥2.

FIG. 9 shows, in the same manner as FIG. 5 (first embodiment), a timing chart of the AEC operation according to the third embodiment. In the third embodiment, the target coefficient G(K) is set so that the calculated value Da will gradually become close to the target value $D_{TH}$ in each monitoring operation. As a result, compared to the timing chart of FIG. 5, this timing chart mainly differs in the monitoring timings of the accumulation/monitoring operation OP2 and the monitoring cycle in the accumulation/monitoring operation OP2 is shortened along with the lapse of time.

According to the third embodiment, in both the case where the intensity of radiation is comparatively high and the case where intensity of radiation is comparatively low, the next monitoring timing (the next timing to perform monitoring) can be appropriately determined based on the past monitoring timings and their monitoring results. Therefore, the third embodiment is also advantageous in increasing the accuracy of AEC.

(Others)

Several preferred embodiments have been described above, but the present invention is not limited to them. The embodiments may be partially changed without departing from the scope or spirit of the invention. For example, although each of the above-described embodiments referred to a so-called "indirect conversion type" arrangement which converts the radiation into light by a scintillator and converts the converted light into an electrical signal by a sensor, the present invention can also be applied to a so-called "direct conversion type" arrangement which directly converts the radiation into an electrical signal.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-129199, filed Jun. 26, 2015, which is hereby incorporated by reference herein in its entirety.

What is claimed is:

1. A radiation imaging apparatus that includes a plurality of sensors, a drive unit configured to drive the plurality of sensors, a readout unit configured to read out a signal from each sensor driven by the drive unit, and a control unit,
wherein the control unit performs
a first control of monitoring, after radiation irradiation to the plurality of sensors has been started, a signal of a first sensor, out of the plurality of sensors, while driving the first sensor by the drive unit to read out the signal of the first sensor by the readout unit, and accumulating the monitored signal of the first sensor,
a second control of outputting, in response to a calculated value obtained by the accumulation in the first control and reaching a target value, a control signal to end the radiation irradiation, and
a third control of reading out, after the radiation irradiation is ended by the second control, the signals of the respective plurality of sensors by the readout unit while driving the plurality of sensors by the drive unit, and
the control unit changes a monitoring cycle of the first control based on the target value and an elapsed time since the radiation irradiation has been started.

2. The apparatus according to claim 1, wherein the control unit prolongs the cycle of the monitoring of the first control in accordance with the elapsed time.

3. The apparatus according to claim 2, wherein using an integer K of not less than 1, and
letting $t(K)$ be time when a Kth monitoring operation has been performed,
$T(K)$ be the elapsed time when the Kth monitoring operation has been performed,
the control unit determines a time $t(K+1)$ to perform a $(K+1)$th monitoring operation so as to hold a following relation:

$$\{t(K+1)-t(K)\} \propto T(K).$$

4. The apparatus according to claim 1, wherein in the first control, the control unit determines, based on a value of the signal of the first sensor which has been monitored up to that time, a timing of monitoring the signal of the first sensor.

5. The apparatus according to claim 4, wherein using an integer K of not less than 2, and
letting $t(K-1)$ be time when a $(K-1)$th monitoring operation has been performed,
$t(K)$ be time when a Kth monitoring operation has been performed,
$D(K-1)$ be the calculated value obtained from a first to the $(K-1)$th monitoring operations,
$D(K)$ be the calculated value obtained from the first to the Kth monitoring operations,
$D_{TH}$ be the target value, and
$G(K+1) \times D_{TH}$ be a target value of the calculated value obtained from the first operation to a $(K+1)$th monitoring operation when the $(K+1)$th monitoring operation has been performed using a coefficient $G(K)$ which is the coefficient $G(K)$ and satisfies $0 < G(K) \le 1$ and $G(K-1) < G(K) < G(K+1)$,
the control unit can determine time $t(K+1)$ to perform the $(K+1)$th monitoring operation so as to hold a following relation:

$$t(K+1)-t(K)=\{(t(K)-t(K-1))/(D(K)-D(K-1))\} \times \{G(K+1) \times D_{TH} - D(K)\}.$$

6. The apparatus according to claim 4, wherein in the first control, the control unit performs, a first monitoring operation, at a timing when the calculated value obtained by the first monitoring operation becomes a value smaller than half of a value of the target value.

7. The apparatus according to claim 1, wherein the control unit adds the calculated value obtained in the first control and a value of the signal read out from the first sensor in the third control.

8. The apparatus according to claim 1, wherein the plurality of sensors are arrayed so as to form a plurality of rows and a plurality of columns, and
in the first control, the control unit drives, as the first sensor, each sensor arranged on some of the plurality of rows by the drive unit.

9. The apparatus according to claim 8, wherein the some of the plurality of rows are not less than 2 rows, and
the control unit alternately performs, in the first control, driving of each sensor arranged in one of the not less than two rows by the drive unit and driving of each sensor arranged on the other of the not less than two rows by the drive unit.

10. The apparatus according to claim 1, wherein the control unit performs, before starting the first control, an operation to initialize the plurality of sensors by driving the plurality of sensors by the drive unit.

11. A control method of a radiation imaging apparatus that includes a plurality of sensors, a drive unit configured to drive the plurality of sensors, and a readout unit configured to read out a signal from each sensor driven by the drive unit, and a control unit, comprising:
monitoring, after radiation irradiation to the plurality of sensors has been started, a signal of a first sensor, out of the plurality of sensors, while driving the first sensor by the drive unit to read out the signal of the first sensor by the readout unit and accumulating the monitored signal of the first sensor,
outputting, in response to a calculated value obtained in the accumulating and reaching a target value, a control signal to end the radiation irradiation, and
reading out, after the radiation irradiation is ended in the outputting, the signals of the respective plurality of sensors by the readout unit while driving the plurality of sensors by the drive unit,
wherein in the accumulation, a monitoring cycle is changed based on the target value and an elapsed time since the radiation irradiation has been started.

* * * * *